No. 631,662. Patented Aug. 22, 1899.
P. A. PETERSON.
CORN PLANTER ATTACHMENT.
(Application filed Sept. 24, 1897.)
(No Model.)
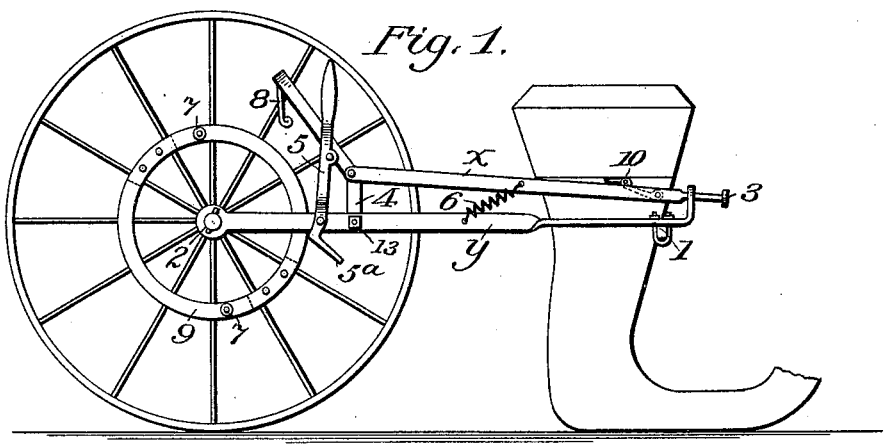
Fig. 1.
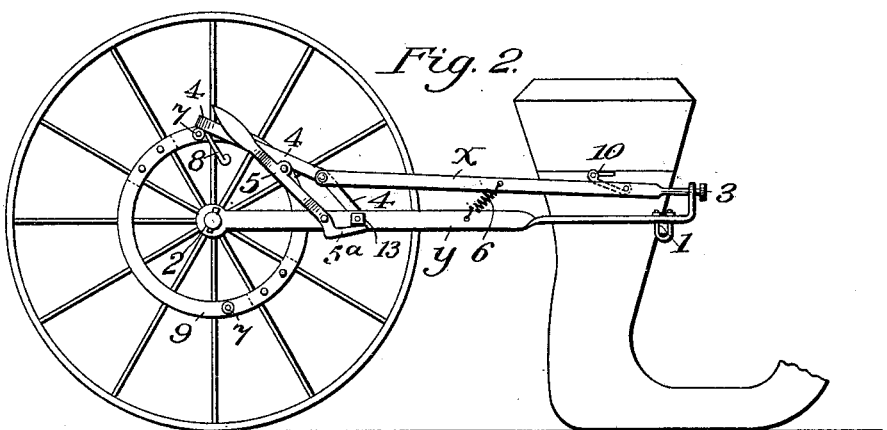
Fig. 2.
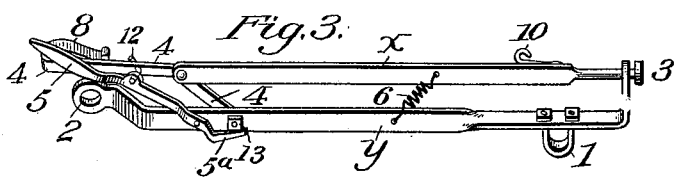
Fig. 3.
Fig. 4.
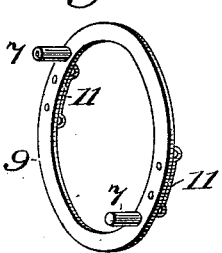
Witnesses.
L. W. Ferguson
Daniel Lunor
Inventor.
P. A. Peterson

UNITED STATES PATENT OFFICE.

PETER A. PETERSON, OF LAKE MILLS, IOWA.

CORN-PLANTER ATTACHMENT.

SPECIFICATION forming part of Letters Patent No. 631,662, dated August 22, 1899.

Application filed September 24, 1897. Serial No. 652,940. (No model.)

*To all whom it may concern:*

Be it known that I, PETER A. PETERSON, a citizen of the United States, residing at Lake Mills, in the county of Winnebago and State of Iowa, have invented an Improved Attachment for Check-Row Corn-Planters, of which the following is a specification.

My invention consists of a mechanism adapted for attachment to a check-row corn-planter for regulating the discharge of the seed.

The attachment is simply constructed and adapted for use on various check-row planters with which a wire is employed and in which the seed box or hopper is secured to a vertical hollow standard attached to and supported by a furrow-opener and followed by a frame carrying the driver's seat and supported by large running or transporting wheels.

In the accompanying drawings, Figure 1 is a side view of my attachment applied to a corn-planter of the type before specified, the attachment being held in such position that it is out of gear, and hence out of action. Fig. 2 is a side view showing the attachment in gear. Fig. 3 is a perspective view of the main portion of the attachment proper. Fig. 4 is a perspective view of the tappet-wheel forming part of the attachment.

The attachment consists, mainly, of the following parts—namely, the tappet-wheel or annular rim 9, secured to one of the running-wheels of the planter; a fixed bar $y$, which is arranged horizontally and rigidly connects the axle of the running-wheels with the planter-frame proper; a slidable rod or bar $x$, arranged over and substantially parallel to said fixed bar $y$ and serving to operate the seed-discharge valve in the seedbox; a tappet-lever 4, pivotally connected with bars $x$ $y$, and a hand-lever 5, which is provided with a bent lateral prong or arm 12 (see Fig. 3) for engaging the tappet-lever 4 and temporarily supporting it so that the attachment is held out of gear, and hence out of action.

The details of construction, arrangement, and operation are as follows:

The fixed bar $y$ is detachably secured to the axle 2 by means of a pin or other suitably-removable device. Its front end is similarly secured to a sill or cross-bar 1, forming part of the planter, by means of a clevis, as shown. The front extension of said bar $y$ is bent upward and provided with a guide-hole for the reduced end 3 of the slidable bar or rod $x$ to play freely in. The tappet-lever 4 is bent at an obtuse angle and pivoted at its lower end to the fixed bar $y$ and at its angle to the slidable rod $x$. A wiper 8 is fixed in and pendent from the upper rear end of said lever 4, thus forming an acute angle therewith. This wiper successively engages the lateral pins 7 of the annular rim 9, which is detachably secured to the spokes of the running or transporting wheel, on the free side of the latter, by means of clips 11, so that the said pins are in practically the same vertical plane as the lever 4 and slidable rod $x$.

10 indicates a hook which connects the rod $x$ with a ratchet-pawl (not shown) which operates a rotary seed-valve (not shown) arranged within the seed-hopper. A spiral spring 6 connects the rod $x$ and bar $y$ in such manner as to tend to retract the former after each forward movement caused by engagement of the tappet-lever with pins 7 on wheel 9.

The operation will be now readily understood. As the planter advances, the running-wheel and tappet-wheel 9 rotate together, and the pins 7 of the latter strike successively and alternately upon the arm 8 of lever 4, thereby throwing the free end of the latter forward and upward and causing the rod $x$ to slide forward in its guide, thus operating the seed-valve and effecting discharge of the seed. So soon as the wiper 8 has passed out of contact with a pin 7 the spring 6 retracts the rod $x$, so that the latter is thrown back to its former position in readiness to strike the next pin 7.

In the field I may use two rods, each twelve feet in length, for measuring the distance between rows of hills.

The first thing to do when beginning to plant a field is to set the planter in due position at one end of the same and to turn the running-wheel carrying the tappet-wheel 9 until one hill is planted. Then lay one of the aforesaid rods crosswise of the field, with one end on such hill, so that when the planter returns it will cross the other end of the rod. When the planter has been driven to the other end of the field, lay the other rod exactly over the last hill just planted. Then turn the planter and take care that the first hill of the next or return row is planted directly over the other end of this rod. Then move such rod and relay it, so that in returning the planter will cross the same at eight feet from the hill last planted, whereby the last hill of the next row will be at the end of the rod which is next to the unplanted portion of the field. By such method a field may be checkrowed as accurately as with the use of a wire, the expense, manipulation, and transportation of which are thus avoided.

To support the tappet-lever 4 out of action or in such a position that it cannot strike the pins 7 of wheel 9, as illustrated in Fig. 1, I employ a lever-arm 5, which is pivoted to the fixed bar $y$ in rear of the pivotal point of the tappet-lever and is provided with a lateral prong 12 to adapt it to engage the tappet-lever. The free end of said arm 5 is constructed as a handle to adapt it to be seized and raised by hand when it is desired to arrest the operation of the seed-dropper. The extended lower end or angular heel $5^a$ of said lever-arm 5 is adapted to come in contact with a projection or stop 13 on the bar $y$, so that the arm is held in horizontal position when not in use, as in Fig. 2. In practice a nut or bur 13 serves as such projection or stop.

What I claim is—

1. The combination, with a planter, of an attachment comprising a slidable rod, for connection with a seed-discharge valve, a forward guide for the rod, a bent tappet-lever pivoted to a fixed portion of the frame, an annulus or circular rim secured to one of the running-wheels of the planter, and having lateral pins in the same vertical plane with the tappet-lever, and a spring applied substantially as described for retracting the rod between the impulses of the tappet-wheel, as specified.

2. The combination, with the fixed bar, having a lateral projection as specified, and a slidable rod and tappet-lever, of the pronged locking-arm, pivoted to the fixed bar and having an angular heel or extension adapted to come in contact with the aforesaid projection, as and for the purpose specified.

3. The improved planter attachment, composed of the bar having its front end upturned, the seed-valve rod adapted to slide in the latter, the obtuse angle tappet-lever, a retracting-spring, and a locking device, substantially as shown and described.

P. A. PETERSON.

Witnesses:
OLE SCAR,
L. W. GEORGESON.